No. 856,355. PATENTED JUNE 11, 1907.
C. C. MARTIN & W. D. JONES.
APPARATUS FOR RENOVATING AND REFINING BUTTER, OILS, LARD, AND FATS.
APPLICATION FILED SEPT. 4, 1906.
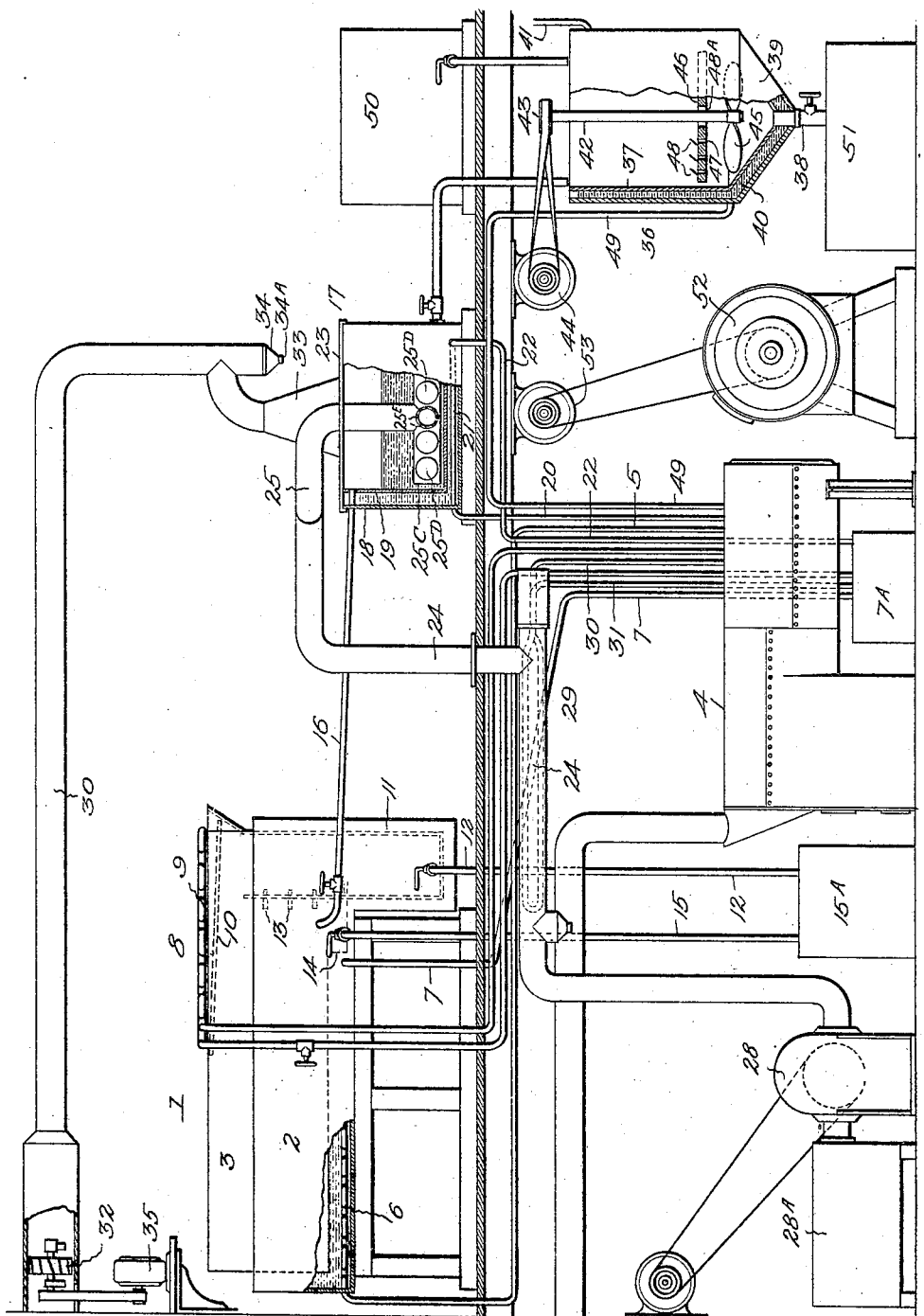
Witnesses:
G. Sargent Elliott
Adella M. Fowle
Inventors:
Charles C. Martin,
William D. Jones,
By H. S. Bailey
Attorney.

UNITED STATES PATENT OFFICE.

CHARLES C. MARTIN AND WILLIAM D. JONES, OF DENVER, COLORADO; SAID JONES ASSIGNOR TO SAID MARTIN.

APPARATUS FOR RENOVATING AND REFINING BUTTER, OILS, LARD, AND FATS.

No. 856,355.   Specification of Letters Patent.   Patented June 11, 1907.

Application filed September 4, 1906. Serial No. 333,172.

*To all whom it may concern:*

Be it known that we, CHARLES C. MARTIN and WILLIAM D. JONES, citizens of the United States of America, residing in the city and county of Denver and State of Colorado, have invented a new and useful Apparatus for Renovating and Refining Butter, Oils, Lard, and Fat, of which the following is a specification.

Our invention relates to a new and improved apparatus for renovating and refining butter, oils, lard, and fat, and the objects of our invention are: first, to provide an apparatus by which old, rancid, moldy, and stale butter can be renovated and refined, and by which machinery-made creamery butter can be improved in purity. Second, to provide a new butter renovating and refining apparatus, in which a new butter melting and curd settling receptacle or tank is provided, in which the butter is first melted, and the curds are settled out of it, and in which the melted butter is kept in a heated and melted state. Third, to provide a butter renovating and refining apparatus, in which a tank is arranged to confine a quantity of the melted butter oil in a shallow body, and for applying indirectly heat to said tank to hold said butter oil in a fluid state, and in which the butter oil can be treated by innumerable needle-like jets of hot air under pressure. Fourth, to provide a butter renovating and refining apparatus, in which a tank is provided that is arranged to keep the melted butter in a melted state, and in which refined butter oil is mechanically mixed with properly pasteurized or otherwise prepared milk or other suitable emulsifying fluid, such as cream, butter milk, or sour milk. Fifth, to provide a butter renovating and refining apparatus, in which butter is refined, emulsified, congealed, and reworked to a perfected, commercial, and consumable state. We attain these objects by the mechanism illustrated in the accompanying drawings, in which:

The drawing shows a plan of a plant showing the machines and elements used in my apparatus for treating butter, oils, lard, and fat.

While our apparatus is adapted to the renovating and refining of oils, lard, and fat, it has been especially designed for renovating and refining butter, and we will describe it for renovating and refining butter only.

Our apparatus consists of a series of machines, which act coöperatively together to achieve the desired result.

Referring to the drawing, the numeral 1, designates a tank which we term the butter melter and curd separator, which performs the first step in our butter renovating and refining apparatus. This tank may be of any desired butter melting capacity, but in our practical and commercial treatment of butter with this apparatus we have preferably made it to hold six hundred pounds of melted butter oil. This butter melting and curd separator tank consists of two tanks 2 and 3, one being placed within the other. The outer tank 2, is provided with a body of hot water, which is kept heated by any suitable means; preferably a steam boiler 4 is used, from which a pipe 5 extends to the tank, and is connected to a coil of pipes 6, within the outer tank, and a return pipe 7 extends from the coil to an exhaust receptacle 7A, at the boiler. The tank 3, rests inside of the tank 2, and extends above it, and its lower portion is surrounded by the water in the outer tank, and at the rear end of the tank 3, a heated platform 8, is placed on which the butter in masses is placed, the practice being to take barrels, kegs, or boxes of butter, which are the ways it is generally shipped, and knock the barrels or kegs or boxes to pieces, and hoist the mass of butter on the platform, which is heated by any suitable means. This platform however, preferably consists of coils of pipe 9, connected to a supply of steam. Below the heated platform, a trough 10 is placed, and the melted butter runs down the trough into a depending compartment 11, formed at one end of both tanks, which is lower than the body of the tanks, and the curds in the butter oil settle into this depending portion of the tank 3, in the bottom of which a valve discharge pipe 12, is placed, and the butter oil is thus separated from the curds and it flows through apertures which are arranged in a vertical row, and are provided with removable plugs 13, that are adapted to be removed and the apertures opened and closed by an operator to suit the height of the melted butter oil in the curd settling compartment, and in the body of the tank 3, another curd settling compartment 14 is formed, which is provided with a valve-controlled discharge pipe 15. This curd compartment is adapted to catch any curds escaping with the butter oil into the body of the tank from the compartment 11, and the two discharge pipes 12 and 15 lead to a curd receiving receptacle 15A. This melted butter oil is kept heated by the hot water of the lower tank, in order to hold it in a fluid form at all times while there is butter oil in the tank. The butter oil is then conveyed by a suitable pipe or conveyer 16, to a machine comprising a double receptacle, tank, or vessel 17, which we term the pneumatic percolator and refiner, which is made of such an area that the butter oil will be confined in a body of shallow depth, and in this tank we subject the butter oil for a period of time of from about three to five hours, to a continuous agitation, which we impart to it by percolating substantially evenly throughout its area thousands of needle-like jets of hot air under sufficient pressure to have a lifting effect on the butter oil, and of sufficient force to exert a tearing, separating, and comminuting and removing effect on the semi-solid, mucilaginous, albuminous, sticky, and other natural or any foreign substance, that may be present in the butter that is under renovating and refining treatment. The amount of time required to treat a charge of butter oil in this pneumatic percolating refiner, depends on the quality of the butter being renovated and refined. This pneumatic percolating and refining machine consists of two tanks 18 and 19, one within the other.

The inner tank 19, may be of any desired capacity, but in practice we preferably make it to hold charges of about twelve to fifteen hundred pounds of butter oil; consequently the contents of the butter melting and curd separating machine is emptied into it when a charge of this weight has been melted in the melting and separating machine, and the inner tank 19 is made of an area that will permit this charge of butter oil to stand in it at a shallow depth, preferably a depth of a few inches, the depth depending on the pressure of the hot air, but we have found in practice that we obtain the best possible results with a pressure of from about eight to sixteen ounces of hot air per square inch, and with a depth of about ten to twelve inches of butter oil, and we heat the air to a temperature of from about one hundred to two hundred degrees Fahrenheit, and we discharge preferably about ten hundred to twelve hundred cubic feet of hot air into this depth and volume of butter oil per minute.

The inside tank 19, sits within the outside tank 18, and the outside tank 18 is heated by any suitable means, preferably by being filled with water which is heated by a steam pipe 20, extending from the boiler 4, to a pipe coil 21, located within the outer tank, from which an exhaust pipe 22 extends. This hot water is used to keep the butter oil at a proper melted liquid state. The inner tank is a closed tank, and is provided with large entrance covers 23, which are preferably positioned at the ends of the tank. The percolating air jets are introduced into the tank through an air conveying pipe 24, from which branches 25 extend to the opposite end portions of the machine, and extend into the tank to its bottom, where they are each connected to a cross-pipe 25C, from the opposite sides of which pipes 25D extend along the bottom of the tank to its central portion and to its ends, and these pipes 25D are provided with innumerable needle-like apertures 25E, which are placed close together along the pipe and are arranged in the pipes of the coils to discharge the air jets in all directions if desired, but preferably downward, so as to discharge close to or against the bottom of the tank. We preferably place fifteen hundred of these hot air jet apertures in each coil; consequently a tank capable of holding about three thousand pounds of butter oil would contain three thousand of these air jet perforations, and the perforations and the coils are so arranged that these jets of air are discharged close together into the butter oil, and substantially evenly throughout the tank's area. The air is supplied by any suitable air compressing machine, such as a blower 28, from which the pipe 24 extends to the tank 19. The blower draws the air through a filter 28A.

The hot air that forms the percolating jets may be heated before it enters the blower or after it leaves the blower, or it may be heated in the course of its compression, to the desired degree, if an air compressor is used, but we preferably heat the air by inserting within the pipe 24 that conveys the air from the blower to the tank 19, a steam coil 29, which is connected to the steam boiler 4 by a pipe 30. An exhaust pipe 31, is also extended from the coil. The air then passes through the steam-heated coil as it flows through the pipe, and is heated to the desired degree of heat, which is regulated at the boiler. This hot air flowing into this sized charge of butter oil under this pressure and in such a great volume per minute, percolates through the butter oil with such a constant steady force that it keeps it in violent agitation, and the air not only most thoroughly charges the butter oil, but these needle-like jets of hot air are very piercing and penetrating, and they eliminate the greater portion of moisture, and thoroughly remove all gases and remove the greater portion of the fungus and germ life, and by its great heat combined with its great force action, which shoots through the mass with thousands of needle-like points, and with the chemical union of the oxygen, this hot air completely saturates, commingles with and comminutes the molecules of the constituent elements of the butter oil, and completely removes all semi-liquids and any albuminous substances and all gummy and sticky and mucilaginous matter that is present in the butter oil. This combined great heat and the force of so many thousand needle-like jets of air, force up through the butter oil and carry with them these deleterious, impure, and foreign elements, and substances, and remove, eradicate, eliminate, and drive out the greater portion of the germ and fungus life and all moisture, and after from about a two to five hour hot air percolating and refining treatment the butter oil is reduced to perfectly pure dry butter oil. The air is then shut off, and the butter oil is then removed from this air percolating and refining tank, and is conveyed to an emulsifying tank, where it is mixed with properly pasteurized and prepared milk, or if desired with cream or butter milk or with sour milk, but preferably with pure fresh properly prepared milk, from which air either hot or cold or in any form, is excluded, as its presence under pressure in the butter oil and milk drives out from the milk and butter oil and emulsifier the bouquet of sweet tasting flavor of the milk, which is the essential element we wish to impart to the butter by this emulsifying treatment. These innumerable hot air jets flow with sufficient pressure up through the butter as to very violently agitate it, and they separate and carry up through the butter oil to its surface and into the space in the tank above it, any impure, foreign, and deleterious matter therein, and this impure, foreign, and deleterious matter is removed from the surface and from above the surface of the butter oil, and from the tank by a suction air blast that is strong enough and has capacity to draw from the tank the discharge of the thousand to twelve hundred feet of hot percolating air jets per minute, and carry all of this matter with it. This suction air blast may be operatively connected to the charge of butter oil by any of the commonly used air suction devices, such as a suction blower or fan 32, and suitable piping 30, leading from above the surface of the butter oil and connected to the receptacle, tank, or vessel in which it is confined to the atmosphere. In the practical application and operation of this feature of our invention, however, we attach a large funnel-shaped pipe 33, to the central portion of the top of the tank, which extends to the atmosphere. A drip trap 34, which is provided with a plugged discharge aperture 34A, is formed in the pipe to catch the oil carried into the lower end of the pipe by the suction air blast, and in the pipe the suction fan 32, is placed, which is operatively connected to an electric motor 35, or other source of power, which is of capacity enough to suck the volume of percolating air and the freed and separated impurities from the butter oil and tank.

The purified and refined butter oil, when it is run into a mixing emulsifier, is very thoroughly stirred, kneaded, agitated, washed, and mixed with properly pasteurized or otherwise prepared milk, cream, butter-milk, or sour milk, until it is fully and thoroughly emulsified. This emulsifying step in our process may be carried out in any positively acting, mechanical stirring emulsifying machine, but in the practical operation of our process we have found it necessary to provide our apparatus with a mechanical and positively operating milk and butter - stirring, kneading, and mixing and emulsifying device 36, as we do not treat the refined butter oil to an air blast either hot or cold in the presence of milk or in the presence of sour milk or in the presence of butter-milk, or in the presence of cream, or in the presence of any other material, and we do not use air either hot or cold in the form of percolating jets, in the emulsifying treatment, but we confine this treating of the refined butter oil and milk to a mechanical mixing of the butter oil and the milk until the butter is properly emulsified by and with the milk. This emulsifying tank comprises a tank 37, having a conical bottom, in which a valve discharge aperture and pipe 38, is placed, and which is surrounded by an outside tank 39, that forms a steam or water jacketed space 40, around the tank, which is provided with a valve water inlet pipe 41; in the axial center of this tank we rotatably mount a vertical shaft 42, that is provided at its upper end with a driving pulley 43, that is adapted to be connected by a belt to a source of power, such as an electric motor 44. On this shaft at the lower portion of this tank, we secure a screw-bladed propeller 45, and at a short distance above the propeller and in the lower portion of the tank we form a partition floor or diaphragm 46, across the tank, in which a plurality of apertures 47 are formed, for the butter oil to flow through. Around each of the apertures 47 on the upper side of the floor we form an angular baffle plate 48, which are all adapted to deflect the jets of butter oil and milk from vertical and other channeling paths. A central aperture 48A is also formed through the diaphragm around the shaft, to allow the butter oil to flow below the diaphragm. The water or steam jacket space is connected by a valve pipe 49, with the boiler 4, and this space is filled with water which is heated and kept hot by steam from the boiler 4. The renovated and refined butter oil is then run into the emulsifier, and a suitable supply of properly prepared milk is also run into the emulsifier from a supply tank 50, until the emulsifier contains a fixed charge, and we preferably make this emulsifying machine to receive the full charge of the melter and curd separator, and of the air percolating tank, which as above stated is about three thousand pounds. After the emulsifier has been filled up, the screw propeller is rotated preferably at a speed of from about one hundred and fifty to two hundred revolutions per minute.

The mechanical emulsifying machine of our apparatus treatment of butter oil differs from all others used in the art of butter renovating and refining. It is not an air blast or air percolating machine, and consequently does not treat butter oil to an air blast in the presence of milk, or to an innumerable number of divided and independent air percolating needle-like jets, and in fact it does not in any manner treat the butter oil with air in any form in the presence of milk or cream or other emulsifying fluid. This feature of our apparatus is purely a mechanical commingling and mixing process of the butter and the milk, which is effected by rapidly revolving the screw propeller, which forces the butter oil and milk up through the apertures in the floor across the tank, which jets are projected in different directions up through the mass of butter oil and milk, while at the same time the butter oil and milk are steadily flowing down to the bottom of the tank through the apertures 47; consequently the butter oil and the milk are kept in a constant and continuous endless movement through the central and other apertures of the diaphragm across the tank until it is thoroughly mixed to a butter-oil milk fluid, which mixing imparts to the butter oil a good pure butter taste. This butter oil mixing treatment is continued for a period of time of from about one to two hours, as the mixing action is very rapid. As soon as this mechanical mixing emulsifying treatment is complete, the emulsified butter oil is run into a cooling and congealing tank 51, which comprises a tank in which a body of clear pure cold or ice water is placed, into which the charge of emulsified butter oil is run, and this cold water congeals the emulsified butter oil into a pasty mass, which is separated from the water and is conveyed to a reworking tank 52, which is a tank provided with rotating paddles or blades, that are rotatably connected to a source of power, such as a motor 53, where it is reworked to a commercially salable and consumable condition.

Our apparatus is very simple. It is practically automatic and continuous in its operation, and it will renovate and refine old ery butter, in a very much less time and with butter, and will improve in purity new creamvery much less expense than the apparatus at present in use; and while we have described the preferred construction and arrangement of the various machines and other coöperating elements of which it is composed, we do not wish to be limited to it, as our invention contemplates the use of any apparatus that melts butter and separates the curds from the resulting butter oil, and then subjects the butter oil to a pneumatic needle-air jet percolating treatment, independent of the presence of milk or cream or sour milk or butter milk in or with the butter oil, and the mechanical mixing of the refined butter oil with properly prepared milk, cream, sour milk, or butter milk without the presence of air in any form, and the congealing and reworking of the emulsified butter oil.

Having described our apparatus, what we claim as new and desire to secure by Letters Patent, is:

1. An apparatus for renovating and refining butter, which consists of a double tank, one part being provided with means for keeping the other part hot, the other part being provided with a heated platform arranged to receive and melt butter, and with a partitioned compartment arranged to separate the curds from the melted butter oil, and provided with a conveyer, a machine at the end of said conveyer arranged to receive and confine said resulting butter oil in charges of a predetermined amount, and in an area of surface of shallow depth, and provided with pipe provided with innumerable needle-like apertures connected to a supply of hot air under sufficient pressure to keep the whole area of the charge of butter oil in boiling agitated condition until the impurities and deleterious and mucilaginous substances have been dissolved, separated, and driven up through said butter oil by the force of said air jets to the surface of said butter oil, and above the surface of said butter oil, and a pipe operatively connected to a power operating motor arranged on said machine and adapted to remove said impurities from the surface of and from above said butter oil by air suction.

2. An apparatus for renovating and refining butter, which consists of a double tank, one part being provided with means for keeping the other part hot, the other part being provided with a heated platform arranged to receive and melt butter and with a partitioned compartment arranged to separate the curds from the melted butter oil and provided with a conveyer, a machine at the end of said conveyer arranged to receive and confine said resulting butter oil in charges of a predetermined amount, and in an area of surface of shallow depth, and provided with pipe provided with innumerable needle-like apertures connected to a supply of hot air under sufficient pressure to keep the whole area of the charge of butter oil in boiling agitated condition until the impurities and deleterious and mucilaginous substances have been dissolved, separated, and driven up through said butter oil by the force of said air jets to the surface of said butter oil, and above the surface of said butter oil, and a pipe operatively connected to a power operating motor arranged on said machine and adapted to remove said impurities from the surface of and from above said butter oil by air suction, a conveyer arranged to convey said refined oil from said oil percolating machine, an emulsifying machine connected to said conveyer, adapted to receive said refined butter oil from said pneumatic percolator and to receive a suitable emulsifying fluid, a rotary stirring device in said emulsifying machine operatively connected to a motor and arranged and adapted to mix said refined butter oil and emulsifying fluid by mechanical means, and without the use of or in the presence of air in any form, means connected with said emulsifying machine for keeping said butter oil in a liquid condition, and a valve controlled means for discharging said emulsified butter oil from said emulsifying machine.

3. An apparatus for renovating butter, which comprises the following instrumentalities, a butter melting and curd separating machine, comprising a tank arranged to melt and separate the curds from the butter, and to keep said butter oil in a melted condition, a conveyer arranged to convey the melted butter oil from the melter and separator to a pneumatic percolating and refining machine arranged to receive said butter oil from said conveyer, and comprising a tank arranged and adapted to hold and confine a shallow quantity of said melted butter oil in a shallow mass in a melted state, and free from contact with milk or any other emulsifying fluid, and from water, and that is provided with thousands of air discharging apertures connected to a supply of hot air under pressure enough to keep said quantity of melted butter oil in a violently agitated condition until the impurities have been carried to the surface of or above said butter oil, and that is arranged and provided with a pipe operatively connected to a suction adapted to remove said impurities by air suction, a conveyer connected to said pneumatic percolating and refining machine, an emulsifying machine connected to said pneumatic percolator and refiner, consisting of a tank provided with means for keeping the butter oil in a melted condition, and having a butter oil stirring device rotatably mounted therein, adapted to mechanically stir said refined butter oil and a suitable emulsifying fluid together, a conveyer connected to said emulsifying tank; a cooling and congealing tank connected to said conveyer adapted to congeal said emulsified butter oil, and an operative emulsified butter oil reworking tank in operative relation to said cooling and congealing tank.

4. An apparatus for renovating and refining butter, which consists of the following instrumentalities, a butter melting and curd separating machine, having a heated platform, on which the butter is melted, partitioned compartments in which the butter curds are separated from said melted butter oil, means including heat for keeping the melted butter oil in a fluid state in said machine, a pneumatic percolating refining machine connected to said butter melting and curd separating machine, and adapted to receive predetermined charges of melted butter oil therefrom, and means including innumerable small air jet apertures in said pneumatic percolating refining machine, operatively connected to a supply of hot oxygen under pressure for subjecting said melted butter oil to innumerable jets of hot oxygen until its impurities and moisture are removed, and it has been renovated to a perfectly pure and refined butter oil.

5. An apparatus for renovating and refining butter, which consists of the following instrumentalities, a butter melting and curd separating machine, having a heated platform, on which the butter is melted, partitioned compartments in which the butter curds are separated from said melted butter oil, means including heat for keeping the melted butter oil in a fluid state in said machine, a pneumatic percolating refining machine connected to said butter melting and curd separating machine and adapted to receive predetermined charges of melted butter oil therefrom, an air supply pipe leading into said pneumatic percolating machine operatively connected to a supply of hot oxygen under pressure, a group of pipes extending from said air supply pipe over the bottom of said percolating machine, thousands of small perforations in said group of pipes arranged close together, and in any predetermined order, and arranged to discharge needle-like jets of hot oxygen into and through said melted butter oil until its impurities are removed, and means including heat for holding said melted butter oil in a suitable melted fluid condition.

6. An apparatus for renovating and refining butter, which consists of the following instrumentalities, a butter melting and curd separating machine, having a heated platform, on which the butter is melted, partitioned compartments in which the butter curds are separated from said melted butter oil, means including heat for keeping the melted butter oil in a fluid state in said machine, a pneumatic percolating refining machine connected to said butter melting and curd separating machine, and adapted to receive predetermined charges of melted butter oil therefrom, an air supply pipe leading into said pneumatic percolating machine operatively connected to a supply of hot oxygen under pressure, a group of pipes extending from said air supply pipe over the bottom of said percolating machine, thousands of small perforations in said group of pipes arranged close together and in any predetermined order and arranged to discharge needle-like jets of hot oxygen into and through said melted butter oil until its impurities are removed, means including heat for holding said melted butter oil in a suitable melted fluid condition, and means including an air suction apparatus operatively connected to said percolating machine for removing the impurities that are separated from said butter oil by said hot oxygen from said pneumatic percolating and refining machine.

7. An apparatus for renovating and refining butter, which consists of the following instrumentalities, a butter melting and curd separating machine, having a heated platform on which the butter is melted, partitioned compartments in which the butter curds are separated from said melted butter oil, means including heat for keeping the melted butter oil in a fluid state in said machine, a pneumatic percolating refining machine connected to said butter melting and curd separating machine and adapted to receive predetermined charges of melted butter oil therefrom, an air supply pipe leading into said pneumatic percolating machine operatively connected to a supply of hot oxygen under pressure, a group of pipes extending from said air supply pipe over the bottom of said percolating machine, thousands of small perforations in said group of pipes arranged close together and in any predetermined order and arranged to discharge needle-like jets of hot oxygen into and through said melted butter oil until its impurities are removed, means including heat for holding said melted butter oil in a suitable melted fluid condition, means including an air suction apparatus operatively connected to said percolating machine for removing the impurities that are separated from said butter oil by said hot oxygen from said pneumatic percolating and refining machine, an emulsifying machine connected to said pneumatic percolating and refining machine, adapted to hold said refined butter oil and a suitable charge of a suitable emulsifying fluid, as milk or cream, said emulsifying machine being arranged and adapted to prevent its charges of refined butter oil and milk from contacting with air under pressure, a rotatable stirring device in said emulsifying machine, a perforated diaphragm in said emulsifying machine, arranged and adapted to break the swirling actions of said stirring device, an emulsified butter oil cooling and congealing machine operatively connected to said emulsifying machine to receive the emulsified butter oil therefrom, and a congealed emulsified butter oil reworking machine arranged in operative relation to said cooling and congealing machine, and adapted to rework said refined emulsified and congealed butter into a commercially salable and consumable commodity.

In testimony whereof we affix our signature in presence of two witnesses.

CHARLES C. MARTIN.
WILLIAM D. JONES.

Witnesses:
G. SARGENT ELLIOTT,
ADELLA M. FOWLE.